March 9, 1937.                G. T. BALFE                2,072,862
GASKET
Filed Dec. 22, 1933                    4 Sheets-Sheet 1
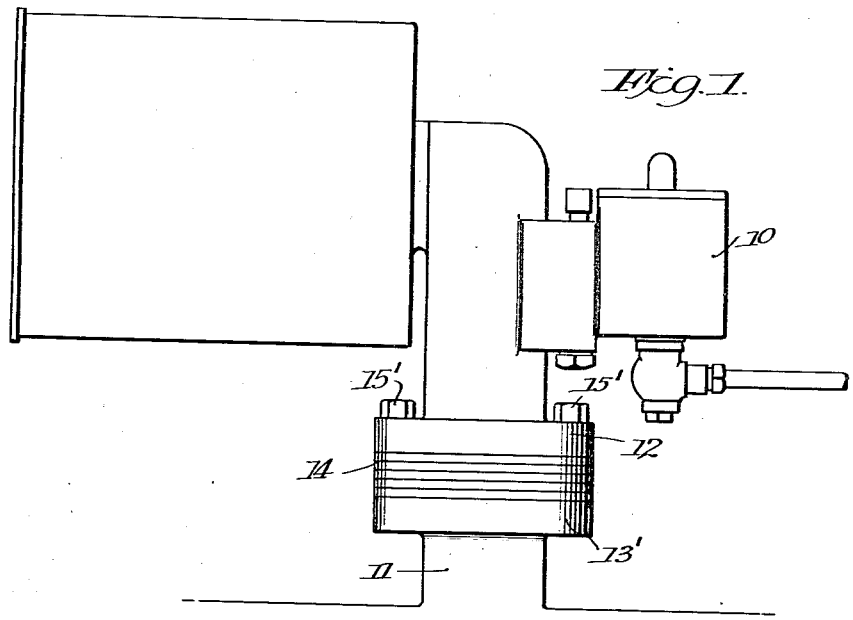
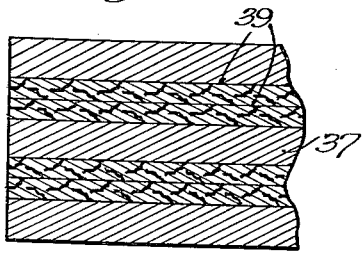
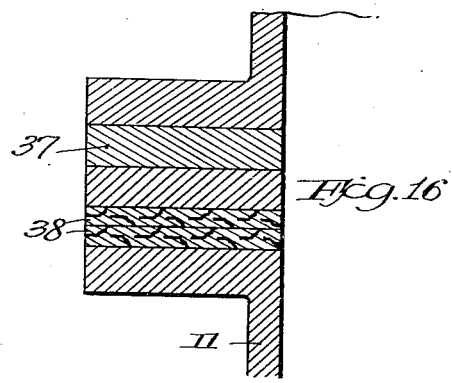
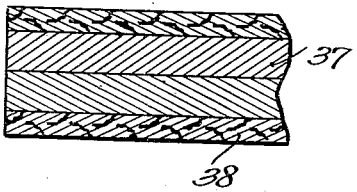
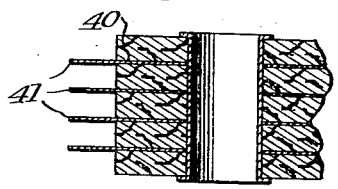
Inventor
George T. Balfe,
By Cushman Darby & Cushman
Attorneys March 9, 1937. G. T. BALFE 2,072,862
GASKET
Filed Dec. 22, 1933 4 Sheets-Sheet 2
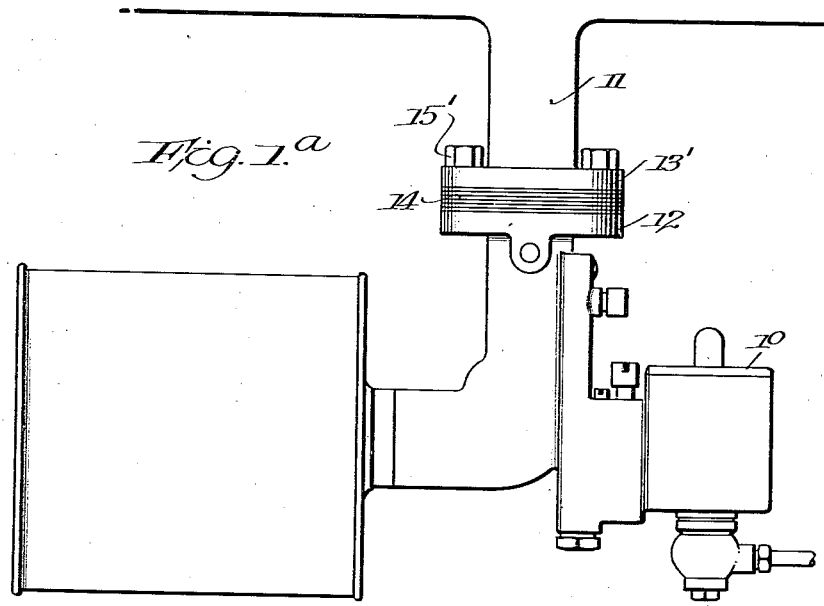
Fig. 1.a
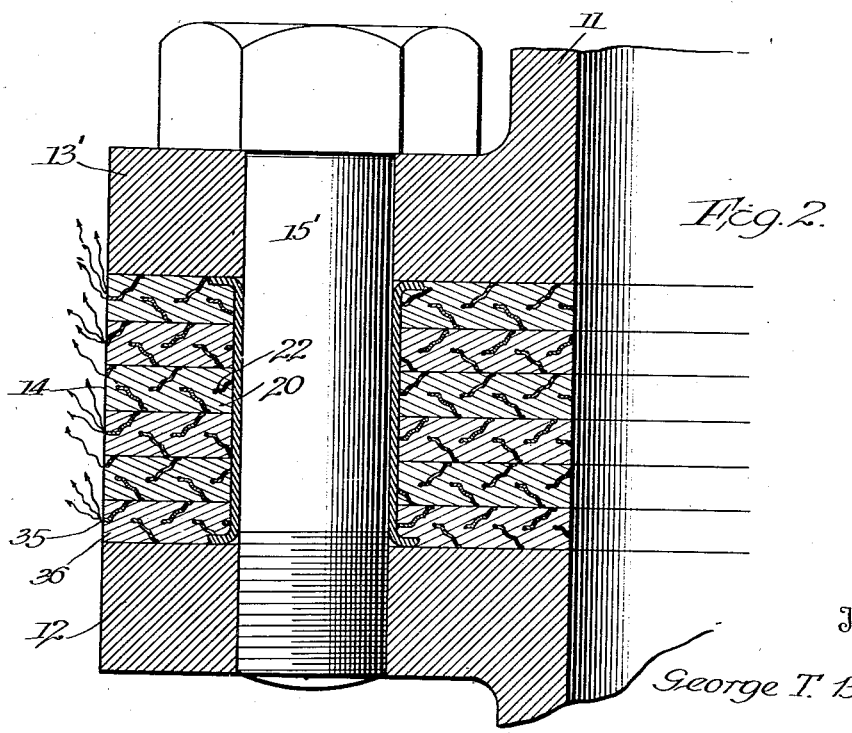
Fig. 2.
Inventor
George T. Balfe
By Cushman Darby & Cushman
Attorneys March 9, 1937.  G. T. BALFE  2,072,862
GASKET
Filed Dec. 22, 1933  4 Sheets-Sheet 3

Inventor
George T. Balfe
By Cushman Darby & Cushman
Attorneys

March 9, 1937.  G. T. BALFE  2,072,862
GASKET
Filed Dec. 22, 1933  4 Sheets-Sheet 4

Inventor
George T. Balfe.
By Cushman Darby & Cushman
Attorneys

Patented Mar. 9, 1937

2,072,862

UNITED STATES PATENT OFFICE 2,072,862

GASKET

George T. Balfe, Detroit, Mich., assignor to Detroit Gasket & Mfg. Co., Detroit, Mich., a corporation of Michigan Application December 22, 1933, Serial No. 703,647

3 Claims. (Cl. 288—1)

My invention relates to gaskets and particularly a gasket of a built-up type which will be heat insulative and heat dissipative. Such gaskets find particular utility at the manifold-carburetor joint of the usual internal combustion engine. It is desirable that the carbureted mixture be maintained cool and dry. At the present time, the various types of packings employed are objectionable in that the mixture is affected and the efficiency of the carburetor interfered with due to the conductivity of the packing whence the heat of the engine is conducted via the manifold through the packing to the carburetor. This is particularly true with present day motors where the so-called down-draft carburetor is disposed above the manifold and the engine.

The present invention in one of its embodiments comprises a built-up laminated packing consisting of alternate layers of cushion insulating material and metal layers. The metal layers have projections struck therefrom and embedded in the cushion layers thereby forming integral composite units. Also, the metal layers have their edge portions exposed to the atmosphere. I have found that with such a gasket which includes a multiplicity of such alternately arranged layers or such units and providing the gasket is sufficiently built-up, that the heat ordinarily prevailing at the joint is not transferred to the carburetor but on the contrary, is dissipated so that the mixture in the carburetor is not affected nor are the working parts of the carburetor subjected to extreme temperature changes and resultant expansion and contraction.

The invention also comprises as another embodiment, a laminated packing as described above, wherein certain of the layers of the built-up structure are composed simply of cushion insulating material, i. e., devoid of metal projections, for example of asbestos or millboard rendered incombustible and infusible. These homogeneous insulating cushion asbestos layers or millboard layers of equivalent materials or mixtures thereof may form the surface contact portions of the packing, or they may form a core therefor, and again are interposed in alternate relation with respect to the composite layers of insulating cushion material and metal.

Packings formed in accordance with this invention, and built-up as above described have the respective layers connected together at spaced points, the layers being otherwise separable from each other and are coextensive and close fitting to form a compressible and insulating sealing structure. These results constitute a marked advance over various conventional packings and in addition, the packings are manufactured at a much lower cost than the molded and machined gaskets now available.

It is therefore the particular object of the present invention to provide a sufficiently built-up packing for association with the carburetor-manifold joint of an internal combustion engine that will conduct heat away from the carburetor i. e., insulate the same, so that it is not subjected to destructive temperature conditions and at the same time, to provide a thoroughly effective cushion seal.

Referring to the drawings:

Figure 1 shows the carburetor-manifold joint of a down-draft carburetor assembly in elevation with my improved packing therebetween;

Figure 1a shows the carburetor-manifold joint of an up-draft carburetor assembly in elevation with my improved packing therebetween;

Figure 2 is an enlarged detail view in section through one of the bolt connections of Figure 1a;

Figure 3:
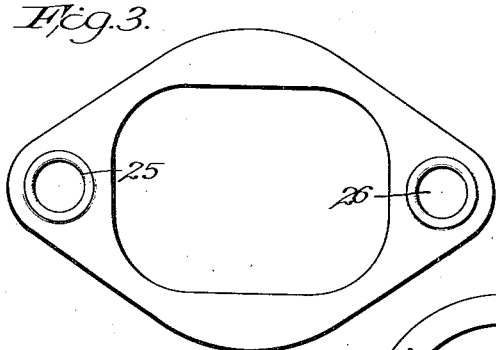
Figure 4:
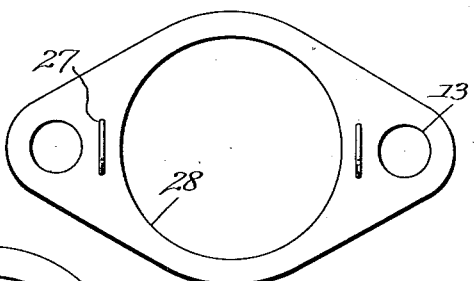
Figure 5:
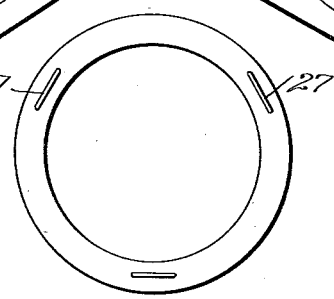
Figure 6:
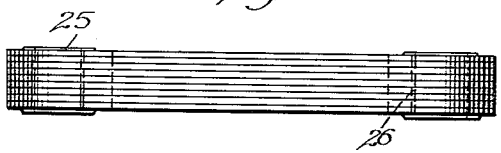
Figure 8:
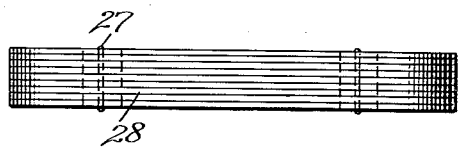
Figure 7:
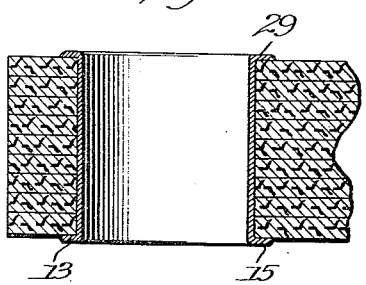
Figure 9:
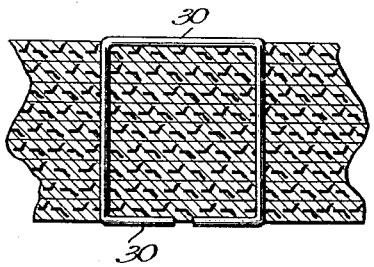
Figure 10:
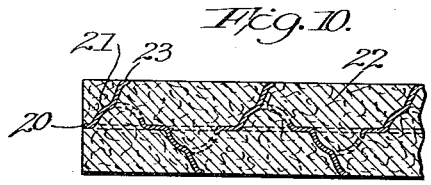
Figure 11:
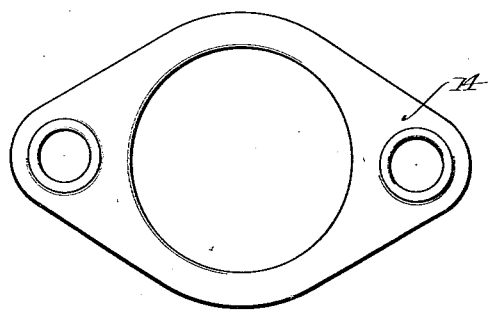
Figure 12:
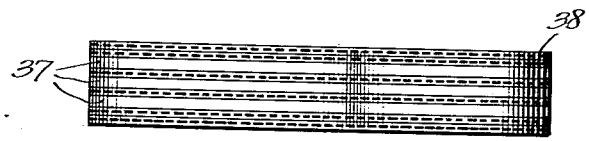
Figure 13:
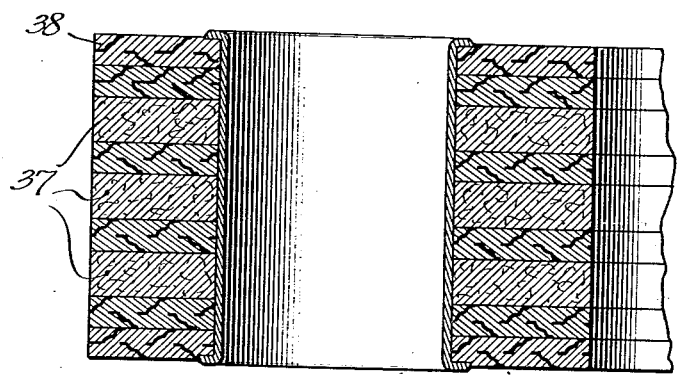

Figures 3, 4, and 5 are elevations of various types of gaskets in accordance with the present invention;

Figure 6 is a side elevation of the gasket shown in Figure 3;

Figure 7 is a transverse sectional view taken through Figure 3;

Figure 8 is a side elevation of the gasket shown in Figure 4;

Figure 9 is a transverse sectional view taken through Figure 4 or Figure 5;

Figure 10 is a sectional view of the gasket material employed;

Figure 11 is a top elevation of a representative packing similar to Figures 3, 4, and 5;

Figure 12 is a side elevation of a packing shown in Figure 11 showing an equally preferred construction;

Figure 13 is a sectional view of the packing shown in Figures 11 and 12;

Figures 14, 15, and 16 are further modifications of the packing shown in Figures 12 and 13;

Figure 17 is another modification showing the packings illustrated in Figures 1 to 16 provided with a separate metal member interposed between the layers and forming fins.

Referring to the drawings, I have illustrated in Figure 1 a down-draft carburetor assembly and in Figure 1a an up-draft carburetor assembly. The carburetor device is indicated at 10 and the manifold conduit at 11. It is to be noted in Figure 1 that the carbuetor is disposed above the engine and the manifold so that it is subjected to heat radiated from the engine as well as to any heat which will usually be transferred through the joint. The joint surfaces of the members 10 and 11 are shown at 12 and 13' respectively and the packing of the present invention whereby heat is dissipated and the carburetor is thoroughly insulated, is illustrated at 14. As is customary, the joint is secured by means of a plurality of bolts indicated at 15'.

Referring to Figure 10, I have illustrated the composite gasket material which is employed in forming the packing of this invention. The construction shown in Figure 10 comprises a metal insert layer of thin steel 20 having projections 21 struck up therefrom and embedded in layers of cushion material 22 preferably of an insulating material such as asbestos thereby forming composite units. The projections may be of any suitable character and preferably are in the form of protuberances and tangs, the tangs either terminating short of the cushion surfaces or flush therewith or the ends may be clinched over and embedded within the plane of the gasket surfaces, so that in any case a smooth and unobstructed contact surface is presented. In the form shown in Figure 10, the metal layers strengthen the packing and the protuberances and tangs constitute a multiplicity of strengthening barriers extending substantially throughout the area of the gasket and prevent tearing and burning, or should a break occur, they effectively withhold further rupture. Moreover, the sheet 20 in cooperation with these metal protuberances and tangs which are struck from the sheet appear to act, in a sufficiently built-up gasket, as heat dissipating means to distribute the heat and transfer it outwardly toward the external colder areas of the gasket which are exposed to the atmosphere and away from the carburetor.

As shown in Figure 10, the protuberances and tangs are embedded in the cushion layers and the cushion layers are embedded in the craters formed by the protuberances and effectively seal the openings defined by the struck up tangs. The gasket is therefore insulating and provides a thorough and complete seal. Also, it is strong and resistant to burning up and blowing such as would rupture the seal, the barriers effectively preventing such action.

Referring to Figures 3 to 9 and Figure 2, in forming the packing of this invention and in order to obtain the insulative and heat dissipative results necessary for successful use of the gasket at the carburetor joint, I superpose a multiplicity of the composite gaskets or units shown in Figure 10 into a built up structure and bind the gasket units together. I may use two or more units, dependent upon the condition presented.

In Figures 3, 6, and 7, the gasket units are connected together by grommets 25 fitting in the bolt opening 26 of the gasket.

In Figures 4, 5, 8, and 9, the gasket units are connected together by metal stitches 27 arranged in Figure 4 between the passage 28 and the bolt openings 26 and in Figure 5, spaced circumferentially of the ring structure.

Both the grommet flanges 29 and the exposed stitch portions 30 are preferably embedded within the adjacent cushion layers 22 so that a smooth contact surface is obtained. The position of the flanges 29 and exposed portions of the wire 30 is shown somewhat exaggerated in the drawings.

While I have illustrated in Figure 10, a gasket unit of the type shown and described in my Patent No. 1,776,140, September 16, 1930, I will also use a gasket unit of the type illustrated in my Patent No. 1,927,450, September 19, 1933, and formed into the composite structure in the manner described.

Referring to Figure 2, I have illustrated a composite or built up gasket of the type shown in Figure 7 positioned in the manifold-carburetor joint.

Each cushion layer of each composite gasket or unit is in contact with the adjacent cushion layer of the next unit with the metal layer disposed between the cushion layers of each unit. Maximum strength, cushioning and heat insulating results are thus obtained.

It is to be noted particularly that the edges 35 of the metal layers are exposed to the atmosphere as are the adjacent edge portions 36 of the cushion layers as shown in Figure 2.

The result of this construction is that notwithstanding the excessively high temperatures developed in the engine and conducted to the flange 13', the packing does not become heated in such manner as to affect the mixture or the operation of the carburetor. The respective layers of metal and fibrous cushion insulating material are coextensive and are connected at spaced points, the said composite layers being otherwise separately associated. The carburetor will be substantially unaffected by high temperatures at the manifold conduit and at the same time a packing of desired compressibility and affording a permanent thorough seal is provided. As stated, the successful results are only obtained in a built-up gasket.

Continued use of the device has demonstrated that it does not burn out or blow and that the carbureted mixture is maintained in its desired cool and dry state as prepared in the carburetor and the operation of the carburetor is not interfered with.

Referring to Figures 11, 12, and 13, I have illustrated another form of built-up packing 14 which is generally similar to the constructions shown in Figures 1 to 10 and described herein. In this packing, however, I employ plain layers of asbestos, millboard, or other equivalent cushion insulating material 37 devoid of metal projections. These layers 37 are illustrated in Figures 12 and 13 as alternately disposed between the composite layers 38 of metal and cushion insulating material.

However, the layers 37 may form the facing layers for the packing and contact with one or both joint surfaces 12 and 13 as shown in Figure 14.

Also, the gaskets as shown in Figures 11, 12, and 13 may have interposed alternately disposed layers 37 as shown, and in addition be provided with facing layers 37 as shown in Figure 14.

Again the packing may comprise a core consisting of one or more layers 37 on either side of which are disposed the composite layers 38 as shown in Figure 15. In such construction facing layers 37 as in Figure 14 may be provided.

The packing may be built up of several adjacent layers 37 upon which are superposed several adjacent layers 38 as in Figure 16.

The respective layers are connected in their built-up relation at spaced points, being otherwise separable, all as shown in Figures 1 to 10.

The advantage of using layers 37 of asbestos or millboard lies in the excellent cushioning effect obtainable as well as the efficient insulating values secured. That is, by controlling the character of the material, its thickness, and its disposition with relation to the composite layers 38, the layers 37 assist both in regulating the compressibility of the built-up product as well as its insulating characteristics.

Various arrangements of the layers 37 and 38 may be employed depending upon the engine, the carburetor and other conditions surrounding the use of the packing. Any suitable numbers of layers will likewise be employed in accordance with the conditions incident to the application of the packing.

The layers 37 may be of various thicknesses and preferably are of greater thickness than the composite metal and cushion material layers 38.

While I have indicated that the layers are held together at spaced points by grommets or stitching, I will in some instances dispense with such fastenings, and by means of a suitable adhesive unite the layers into the built up structure. Such adhesive which is preferably heat resistant will be spread as a film or layer 39 over the abutting surfaces of the gasket layers or about the outer edge or other suitable areas thereof and the structure then compressed into the built up packing shown.

Referring to Figure 17 I have shown a packing of the character illustrated in Figures 1 to 16 and interposed between the layers thereof is a suitable metal plate 40 which may or may not be perforated and which is of greater area than the area of the other packing layers. In this manner, metal fins 41 are obtained extending beyond the confines of the other packing layers and serving to further dissipate the heat where a particularly high temperature condition is encountered. As many of these plates 40 may be used as desired. The metal layers 20 may also be extended to form fins 41.

The plates 40 are also associated with plain layers 37 and the packing built up in the manner shown.

The surfaces of the composite layers or the layers 37 may have a non-sticking film of graphite or coating of equivalent material for this purpose. This is particularly desirable at the surfaces of the packing which abut the joint contact surfaces 12 and 13.

Also the layers of fibrous cushion insulating material will have incorporated therein a temperature, pressure and liquid and gas resistant material as described in my Patent No. 1,788,041.

While I have referred to composite layers of the type shown in Figure 10, it will be understood that I will use also packing units comprising a single layer of metal and a single layer of cushion material as defined in my aforesaid patents. These units having the cushion layer on one side of the metal insert only may be built up in the manner described herein. Also I apply to the free or plane metal surface of such gaskets a layer of plain millboard or asbestos which may be glued to the said metal layer and units of this type built up into a packing of the character shown.

This application is a continuation in part of my application No. 648,691 filed December 23, 1932, which is a continuation of my application No. 632,824, and is also a continuation in part of my application No. 690,739 filed September 23, 1933.

I claim:—

1. A gasket for use in locations where it is necessary to prevent heat transfer from a high temperature source comprising a multiplicity of separate units, said units consisting of superposed layers of heat resisting cushion material and metal, the metal layers disposed between the cushion layers and having integral prongs for securing together said metal and cushion layers, the metal layers further having their edge surfaces exposed to facilitate heat dissipation, said gasket having a service opening formed therethrough, and means for securing the units together.

2. A gasket for use in locations where it is necessary to prevent heat transfer from a high temperature source comprising a multiplicity of separate units, said units consisting of superposed layers of heat resisting cushion material and metal, the metal layers disposed between the cushion layers and having integral prongs for securing together said metal and cushion layers, certain of said units having therebetween a layer of heat resisting cushion material devoid of metallic prongs, the metal layers further having their edge surfaces exposed to facilitate heat dissipation, said gasket having a service opening formed therethrough, and means for securing the said last mentioned cushion layer and said units together.

3. A gasket for use in locations where it is necessary to prevent heat transfer from a high temperature source comprising a multiplicity of separate units, said units consisting of superposed layers of heat resisting cushion material and metal, the metal layers disposed between the cushion layers and having integral prongs for securing together said metal and cushion layers, the metal layers further having their edge surfaces exposed to facilitate heat dissipation, and a layer of cushion material devoid of metal projections and forming at least one surface of the gasket, said gasket having a service opening formed therethrough, and means for securing the units and said last-mentioned cushion layer together.

GEORGE T. BALFE.